United States Patent
Minov

(10) Patent No.: US 8,732,708 B2
(45) Date of Patent: May 20, 2014

(54) DYNAMIC GENERATION OF SCENARIOS FOR MANAGING COMPUTER SYSTEM ENTITIES USING MANAGEMENT DESCRIPTORS

(75) Inventor: Iassen Minov, Sofia (BG)

(73) Assignee: SAP AG, Walldorf (DE)

( * ) Notice: Subject to any disclaimer, the term of this patent is extended or adjusted under 35 U.S.C. 154(b) by 571 days.

(21) Appl. No.: 12/973,959

(22) Filed: Dec. 21, 2010

(65) Prior Publication Data

US 2012/0159490 A1 Jun. 21, 2012

(51) Int. Cl.
*G06F 9/46* (2006.01)
(52) U.S. Cl.
USPC .......................................... 718/100; 718/106
(58) Field of Classification Search
None
See application file for complete search history.

(56) References Cited

U.S. PATENT DOCUMENTS

| | | | |
|---|---|---|---|
| 7,587,423 B2 | 9/2009 | Kalthoff et al. | |
| 7,827,153 B2 | 11/2010 | Werner et al. | |
| 2008/0040373 A1 | 2/2008 | Kuehmichel et al. | |
| 2008/0079725 A1 | 4/2008 | Sagalov | |
| 2010/0146442 A1* | 6/2010 | Nagasaka et al. | 715/810 |
| 2010/0207947 A1 | 8/2010 | Sagalov | |
| 2010/0257145 A1 | 10/2010 | Felsheim | |

* cited by examiner

*Primary Examiner* — Meng An
*Assistant Examiner* — Blake Kumabe

(57) ABSTRACT

Systems and methods for dynamic generation of scenarios for managing computer system entities are described herein. A number of management programs are deployed in an administrator framework as embedded plug-ins. One or more management descriptors are provided for the plug-ins. The management descriptors include a number of relationships between the deployed programs and a number of computer system entities. The relationships indicate that the management applications can administer one or more aspects of the corresponding entities. A first management program is selected from the number of deployed management programs to administer a related computer system entity. One or more other management programs are dynamically identified and presented to the user as possible management scenarios. The identification of the other management programs is based on correspondence defined in the management descriptors to the aspects or the types of the computer system entity.

14 Claims, 7 Drawing Sheets

DYNAMIC GENERATION OF SCENARIOS FOR MANAGING COMPUTER SYSTEM ENTITIES USING MANAGEMENT DESCRIPTORS

BACKGROUND

One of the aspects of using computer systems includes involves administration and management of the elements of the computer systems. From a hardware perspective, every element of a computer system environment has to be monitored and maintained, e.g., processor units, memory chips, disk drives, power supplies, network connections, etc. The hardware building blocks are configured and tested before installation. After installation, different kinds of data are collected about their performance, and the data is examined to detect possible inefficiencies or malfunctions. Similarly, the different software components implemented in the computer system environments are administered and managed as well. A multitude of tasks have to be performed systematically to provide configuration, maintenance and management of a variety of software entities.

In enterprise computer system landscapes, where usually a large number of computer systems are implemented, a number of different computer programs are used for performing different tasks in hardware and/or software management and administration. Each of these programs may provide functionality for managing different aspects of various software and/or hardware entities implemented in one or more computer systems within a computer system environment. At any point of time, a user may have access or visibility to only one such program. Usually, navigation between the management programs is necessary in order to execute systematic and integrated management scenarios within the computer system environment. Such navigation between the management programs depend on the particular computer system entity that is managed, and is based on predefined correspondence between the management programs. Therefore, the possible management scenarios are statically established, reflecting the predefined correspondence between the management programs. The static nature of the management scenarios reduces the flexibility in administering the computer system entities. Additionally, when new managing programs or new computer system entities are introduced, the maintenance of the static management scenarios could be very expensive.

SUMMARY

Various embodiments of systems and methods providing dynamic scenarios for managing computer system entities are described herein. From one side, a number of management programs are deployed in an administrator framework as embedded plug-ins. For each of the deployed programs, one or more management descriptors are provided. The management descriptors include a number of relationships between the deployed programs and a number of computer system entities. The relationships indicate that the management applications can administer one or more aspects of the corresponding entities. From another side, a user selects a first management program from the number of deployed management programs to administer a related computer system entity. From yet another side, one or more other management programs are identified and presented to the user as possible management scenarios based on the relationships between the one or more other programs and the aspects of selected computer system entities that are defined in the provided management descriptors.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for providing dynamic scenarios for managing computer system entities are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
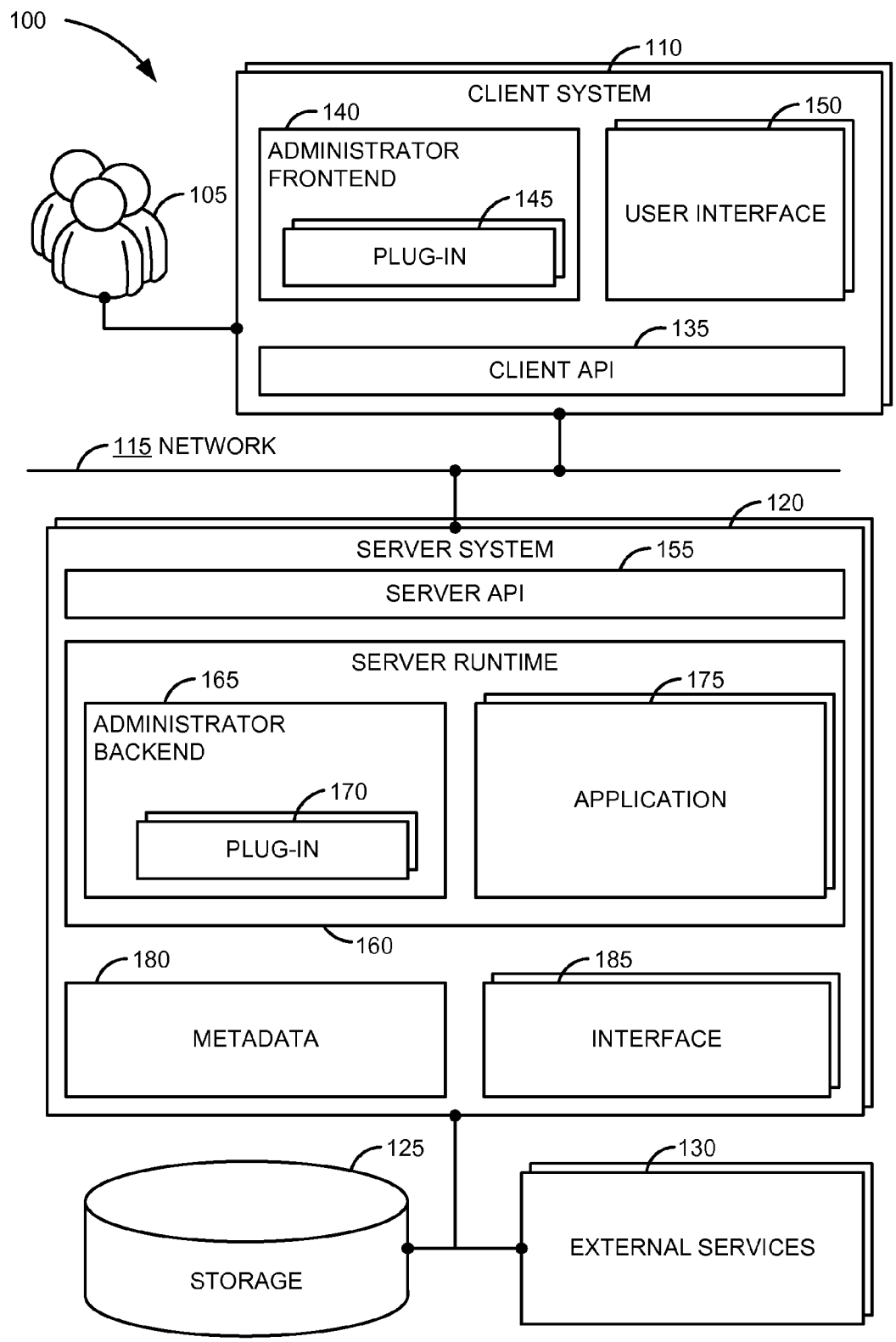
FIG. 1 is a block diagram illustrating a system where dynamic management of computer system entities is provided, according to one embodiment.

System 100 in FIG. 1 provides a simplified example of an enterprise computer system environment, where dynamic management of computer system entities is provided, according to one embodiment. The system 100 includes at least one client system 110 communicating with server system 120 via network 115. Generally, users 105 access client system 110 to configure and operate with various software services provided by one or more software applications deployed in the server system 120. The server system 120 may be built to run one or more application server instances on one or more physical hardware server systems. The server system 120 may be configured as a cluster when more than one application server instances or/and physical hardware servers are included.

The client system 110 may represent a variety of processing devices, e.g., desktop computers, laptops, cellular phones, handheld devices (for example, personal digital assistant (PDA)), navigation devices, etc. Each of users 105 may access one or more sessions of user interface (UI) 150 to operate with the available software services. The client system 110 provides an environment where client side software applications are deployed and executed to provide functionality necessary for accessing the software services at the server system 120. For example, some client side software applications may pre-process service requests initiated through UI 150. Other client side software applications can be used in designing new, or changing existing software services at the server systems 120. Administrator fronted 140 is an example for a client side application implemented in the at least one client system 110 to provide dynamic management of computer system entities by executing one or more management programs, e.g., plug-ins 145, according to one embodiment.

In this document, the terms "embedded management program", "management program", "embedded management application", "management applications", and "plug-in" are used interchangeably.

The client system 110 establishes interface with server system 120 using appropriate functions, methods and data formatting as defined by client application programming interface (API) 135. In one embodiment, the different elements of the client system 110, e.g., UI 150, administrator frontend 140 and client API 135, are implemented within a common framework. For example, an Internet browser could provide such a common framework. The additional functionality required for the described is plug-ins, or other extensions, e.g., Silverlight™ development platform provided by Microsoft Corporation. Other examples for such frameworks may include Java™ Virtual Machine (JVM) originally specified by Sun Microsystems, Inc.; .Net™ Framework specified by Microsoft Corporation, etc.

The modules of server system 120 correspond to some of the basic elements included in general application server architecture. Server runtime 160 establishes environment where one or more software applications 175 are deployed and executed. In one embodiment, administrator backend 165 is also deployed and executed in the server runtime 160. The access to the services provided by administrator backend 165 and applications 175 is managed through server API 155. In one embodiment, metadata component 180 represents data structures where the application server stores descriptions of programming or business objects, and/or different parameters relevant to the deployed applications 175 and administrator backend 165, including plug-ins 170. The metadata 180 could be accessed by the server runtime 160 during the deployment and the execution of the applications 175, the administrator backend 165, and the plug-ins 170. In one embodiment, the server system 120 is built using Java™ based application server platform, e.g., compliant with Java Enterprise Edition (Java EE™) specification. The elements of the server system 120 could be executed within a server side JVM.

Interfaces 185 provide the server system 120 with access to external resources. External services 130 represent an example of such external resources. The external services 130 may be available at other computer systems connected to the server system 120 directly, via network 115, or via other networks. The external services 130 may include business services provided by legacy systems, infrastructure services, messaging or notification services, etc.

Storage 125 is another example of external resources. The storage 125 could include one or more databases, where any of the software and hardware elements of the server system 120, including the physical servers and the application server instances, may extract and store data. The external services 130 may also store and extract data from the storage 125. The data that is placed in the storage 125 could be shared among the different system nodes, including the server system 120 units, the providers of the external services 130, and also including computer systems from other system landscapes. The kinds of data that could be kept in storage 125 include business, data, source codes, log files, system dumps, etc.

In different embodiments, the computer system entities that are managed could be available in the computer system 100, e.g., in the at least one client system 110, in the elements of the server system 120 (including, data stored in the metadata 180, or received at interfaces 185), accessible from the external services 130, in the storage 125, etc. In one embodiment, the implementation of the management functionality or mechanism in the computer system 100 includes the administrator frontend 140 and the administrator backend 165, where the embedded management programs are executed, e.g., plug-ins 145 and 170, respectively. In an alternative embodiment, the management mechanism includes either only frontend implementation or only backend implementation.

The setup and execution handling of the administrator backend 165 could be directed through administrator frontend 140. The responsible users 105 who are authenticated with respective privileges at client system 110 may access the administrator frontend 140 through a session of the UI 150. The administrator frontend 140 may include various controls for execution of the mechanism for managing the entities of the computer system 100, e.g., configuring and executing the plug-ins 145 and 170. Further, the administrator frontend 140 may include functionality for processing, analyzing and presenting the entity management scenarios and the tasks performed by the administrator backend 165.

The administrator backend 165 could be deployed and executed in the server runtime environment 160. In one embodiment, the administrator backend 165 may be integrated with the server runtime 160, e.g., developed as an integral part or enhancement of the JVM.

In one embodiment, the mechanism for managing computer system entities is a Java™ tool for administration of NetWeaver™ platform developed and provided by SAP AG. In this implementation, the management mechanism is called NetWeaver™ Administrator (NWA), and it is part from Java™ Application Server (Java AS) engine. The NWA has pluggable infrastructure allowing different embedded applications to become part of its functionality. The main NWA component that loads and executes these plug-ins is called NWA framework. Other embodiments may be based on different technologies, and implemented in other products.

A mechanism for managing computer system entities may include many managing applications or programs that are embedded in an administration platform, e.g., NWA framework. When this mechanism is executed, one of the applications is active at a moment to execute an administration task directed to one or more aspects of a selected computer system component. In one embodiment, the mechanism is used for managing only software components of a computer system.

In another embodiment, similar mechanism is used to manage either hardware components, or software components of a computer system, or both hardware and software components.

Figure 2:
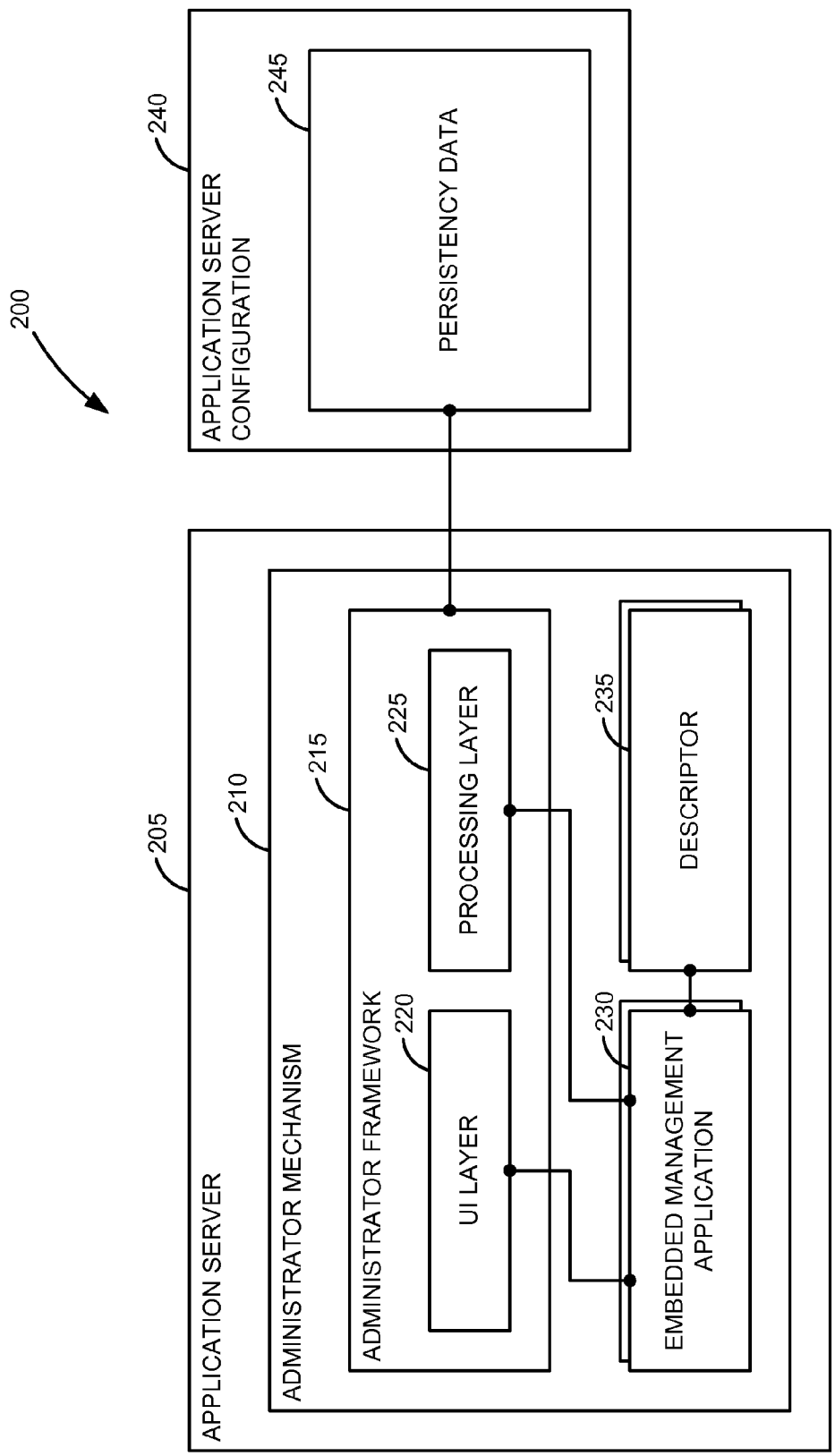
FIG. 2 is a block diagram illustrating a computer system platform where a mechanism providing dynamic scenarios for managing computer system entities is executed, according to one embodiment.

FIG. 2 illustrates computer system platform 200 where a mechanism providing dynamic scenarios for managing computer system entities is executed, according to one embodiment. Application server 205 (e.g., Java AS) provides an environment where administrator mechanism 210 (e.g., NWA) is implemented. Administrator framework 215 is a main part of the administrator mechanism 210. The administrator framework 215 may act as a container for embedded management applications 230. The administrator framework 215 may provide a well structured way to navigate and open the different embedded management applications 230. Additionally, there is a clear interface defined between the administrator framework 215 and the applications 230. This interface is used to manage the lifecycle of the applications 230. Further, the applications 230 may use this interface to get different configurations from the administrator framework 215, e.g., to search for other management applications 230 based on some criteria (or management scenario), and to navigate between the management applications 230.

In one embodiment, the administrator framework 215 includes user interface (UI) layer 220 and processing layer 225. The UI layer 220 contains presentation logic and provides interaction with users, e.g., top level navigation, site map, etc. Also, the UI layer 220 may implement the lifecycle of the management applications 230, like load, call, destroy plug-in. The processing layer 225 contains the main logic of the administrator framework 215. The responsibilities of the processing layer 225 may include handling user sessions of the administrator framework 215, passing of execution context between two or more of the management applications 230, navigation between the management applications 230 and other embedded functionality in the administrator framework 215, storing history, etc.

In one embodiment, the management applications 230 offer a UI to manage or administer computer system entities. For example, the management or administration process may include actions like performing entity configuration, entity behavior monitoring, administering tasks, diagnosing, etc. The management applications 230 could also build and offer navigation links to other management applications 230. This navigation between the available management applications 230 helps in executing various scenarios for managing at least one aspect of one or more computer system entities. These navigation links could be discovered at runtime, according to one embodiment.

Application server configuration 240 stores configuration data for the configuration of the administrator mechanism 210. In one embodiment, the configuration of the administrator mechanism 210 includes information for the administrator framework 215 and for the management applications 230. The configuration data used from the administrator framework 215 is provided in application server configuration 240. The configuration data stored in persistency data module 245 may include top level navigation structure of the administrator mechanism 210, personalization data (per user), execution parameters, descriptions of program objects, etc. In one embodiment, the persistency data 245 is available as metadata in the application server 205.

The information for the management applications 230 is stored within management application descriptors 235, including title, name of the executable class, description, etc. In different embodiments, each management application 230 may have one or more descriptors 235, or one descriptor 235 may provide configuration data for more than one management applications 230. The descriptors 235 include categorization of the management applications 230 based on the managed computer system entities. The descriptors 235 also include the operations that the management applications 230 could perform with their corresponding computer system entities. For example, many computer system entities could be defined in the NetWeaver™ management domain, including "Java™ service", "Java™ application", "development component", "log structure", "functional unit", "Enterprise JavaBean™ (EJB) configuration", etc. A set of operations that could be executed on these entities may include configure, monitor, administrate, diagnose, etc. The categorization of the management applications 230 provided by the descriptors 235 may be used also to dynamically create navigation links between the management applications 230 and to provide dynamic scenarios for managing computer system entities.

When a management application 230 is selected for execution, the administrator framework 215 reads the configuration from one or more corresponding descriptors 235. Based on the categorization in the descriptor 235, one or more computer system entities are identified which can be managed by the application 230. A user may select and manage one of the corresponding entities. The upload of the selected management application 230 for execution by the administrator framework 215, the collection of data regarding an entity to be administered, and the generated management data generates context within the administrator mechanism 215. In general, the context includes the configuration data, the UI data, the data generated during the management actions, etc. A significant part of the context is generated based on UI input provided by a user. Such UI context for a management application 230 may contain a number of UI properties (e.g., options, parameters, and their current values) that are available to a user either for providing information or for receiving input.

In one embodiment, the correspondence between the management applications 230 and the computer system entities is defined in the descriptors 235 by specifying different types of entities that could be managed by the separate applications 230. Further, the descriptors 235 may specify the actions that could be performed with the different types of computer system entities. The definition for a computer system entity with respect to administration and management could be very broad. Such definition may include software and/or hardware objects. For example, the types of software entities that could be managed by applications 230 include services, applications, logs, etc. Each such entity may be characterized by one or more aspects or features. Similar aspects of entities of different types may be managed by same applications 230.

Figure 3:
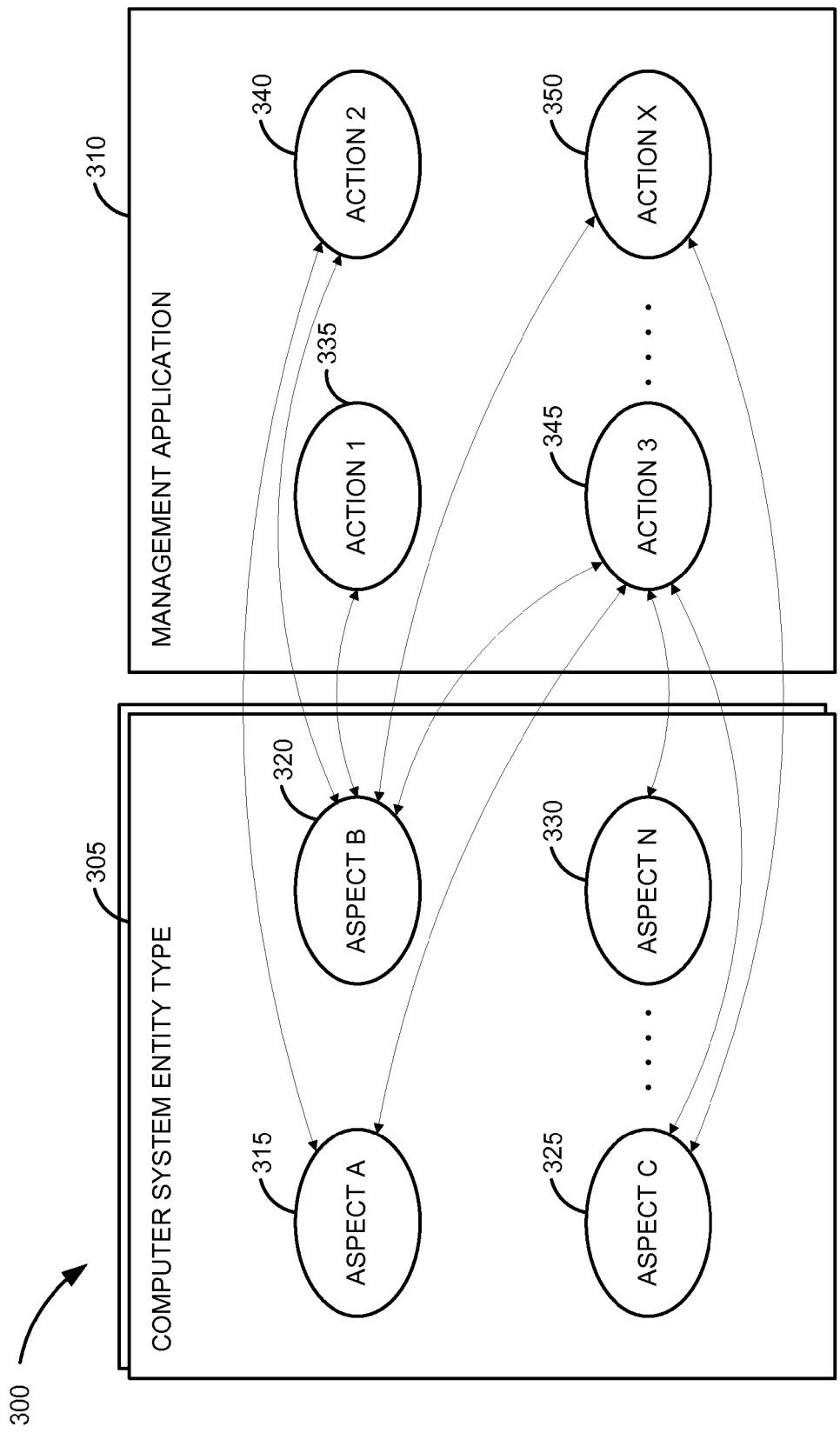
FIG. 3 is a block diagram illustrating correspondence between computer system entity and a management application, according to one embodiment.

FIG. 3 shows correspondence 300 between at least one computer system entity type 305 and a management application 310. Each of the at least one computer system entity types 305 is characterized by a group of properties, e.g., aspects "A" 315 to "N" 330. The group of aspects characterizing different entities may be different. However, common aspects between different computer system entity types 305 may be identified. Each aspect 315 to 330 of computer system entity type 305 could be administered by using one or more of the actions "1" 335 to "X" 350 supported by management application 310.

Different management applications could provide similar actions, e.g., actions 335 through 350 provided by management application 310 could be provided by one or more other management applications as well. Further, one aspect of the computer system entity type 305 could be managed by an action provided by management application 310, while another aspect could be managed by an action provided by another application. For example, a log file may contain data regarding a service execution and data regarding application configuration as separate aspects. A first management application may be used to analyze the service data in the log file, while a second management application may be required to change the application configuration data.

In one embodiment, a descriptor is provided for each management application 310 embedded in an administrator framework to define the correspondence between the management application 310 and different types of entities 305. The descriptor may contain correspondence between different aspects of one or more entity types 305 and one or more actions provided or supported by the management application 310 as illustrated in FIG. 3.

In one embodiment, tens and hundreds of plug-ins providing different management functionality could be deployed in a computer system, e.g., embedded in an administrator framework. Some of these plug-ins may be developed by the vendor of the administrator framework, others could be custom based, or provided by third parties. The administration of a computer system entity may require actions supported by more than one of the embedded management systems, e.g., management scenarios involving a number of plug-ins are involved. Therefore, when a new plug-in is deployed, links have to be created to and from the compatible management applications already deployed. The sizeable number of plug-ins provided by different developers makes such operation very challenging. However, based on the relationships provided with the help of descriptors, the administrator frameworks may identify links between compatible embedded management applications. Thus, dynamic management scenarios are created to be followed for managing same or different aspects of computer system entities by more than one plug-ins.

Figure 4:
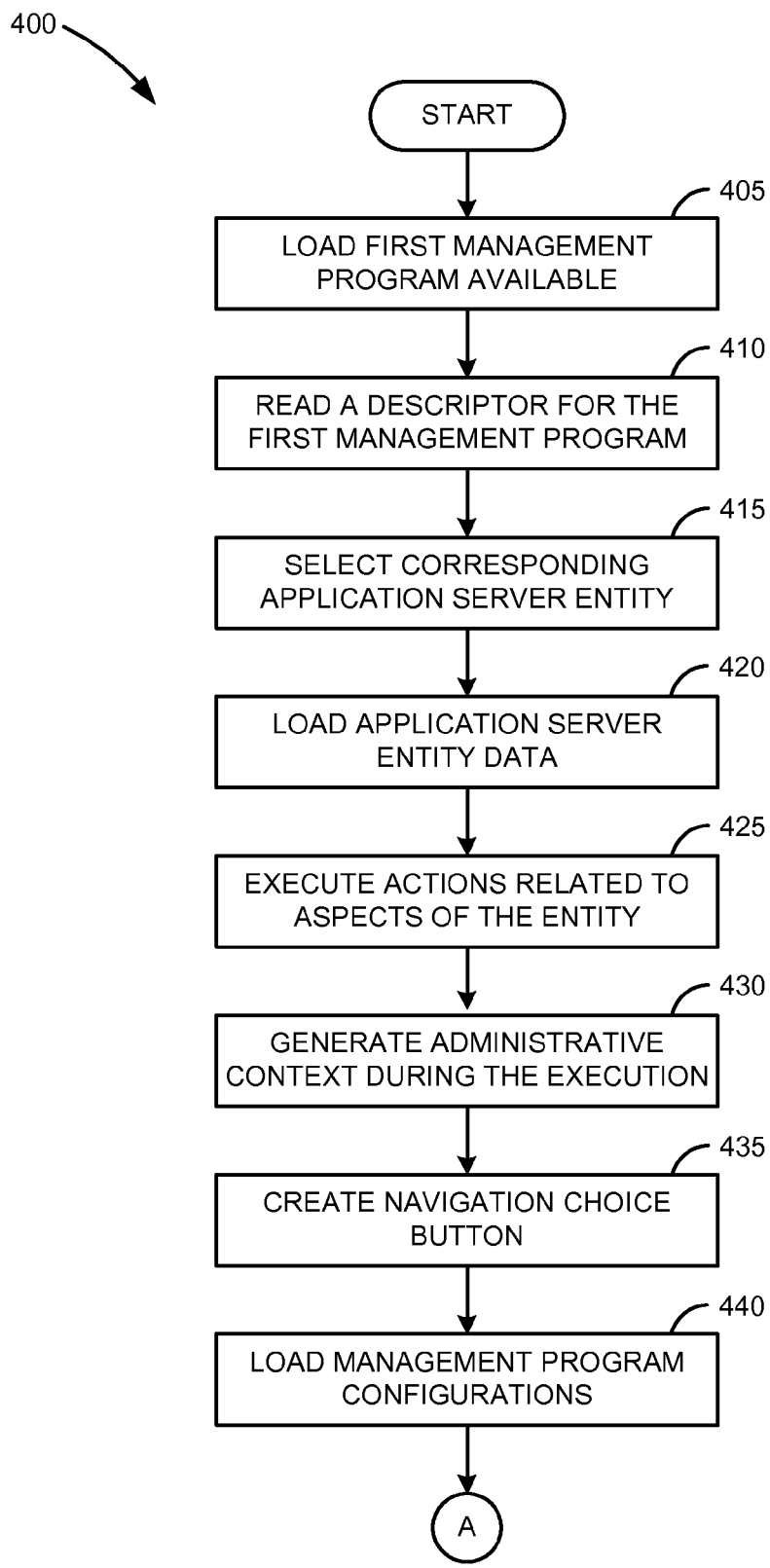
FIG. 4 illustrates a first part of a process for generating dynamic scenarios for managing computer system entities, according to one embodiment.

FIG. 4 shows a first part 400 of a process for generating dynamic scenarios for managing computer system entities, according to one embodiment. At 405, a first management program is loaded within an administrator framework to be executed for managing one or more entities. The first management program could be selected by a user from a list of available (e.g., deployed) management programs embedded in the administrator framework.

With the loading of the selected first management application, the administrator framework reads a corresponding descriptor for the first management program at 410. From the descriptor, a number of application server entities could be identified to be administered with the help of the first program. At 415, an application server entity corresponding to the first management program is selected. In one embodiment, the computer system entities identified with the help of the descriptor are presented for selection to a user, e.g., via a displayed UI. In one embodiment, a software entity is selected for administration. Alternatively, a compatible hardware entity can be similarly identified and managed.

At 420, the first management program loads data for the selected software computer system entity. The data could be generated by application server where the selected software entity is instantiated. For example, the loading of application server entity data may include reading log files, collecting diagnostic data, accessing system parameters, querying databases, generating service requests, etc.

A management action related to one or more aspects of the selected entity is executed at 425. For example, the action could be triggered through a UI by a user, or automatically executed as a result of workflow operations. The action is part of the functionality of the first management application. The execution of the action generates administrative context at 430. The administrative context generally contains the current status of the entity management, like, selecting execution options for the action of the first program, e.g., via UI screens, generated data during the entity management, etc. Different management actions provided by the first program could be executed referring to a same or different aspects of the selected entity.

The administration of the selected computer system entity may continue using other embedded management programs. The administrator framework may identify, e.g., based on the generated administrative context, a situation where other available programs could be also used for managing the selected entity, or for managing other related entities. At 435, a navigation choice button is created, or made accessible, in a UI corresponding to the first program, when the management process may continue using other programs, according to one embodiment. At 440, the administrator framework loads configurations, e.g., descriptors, for a number of embedded management applications.

Figure 5:
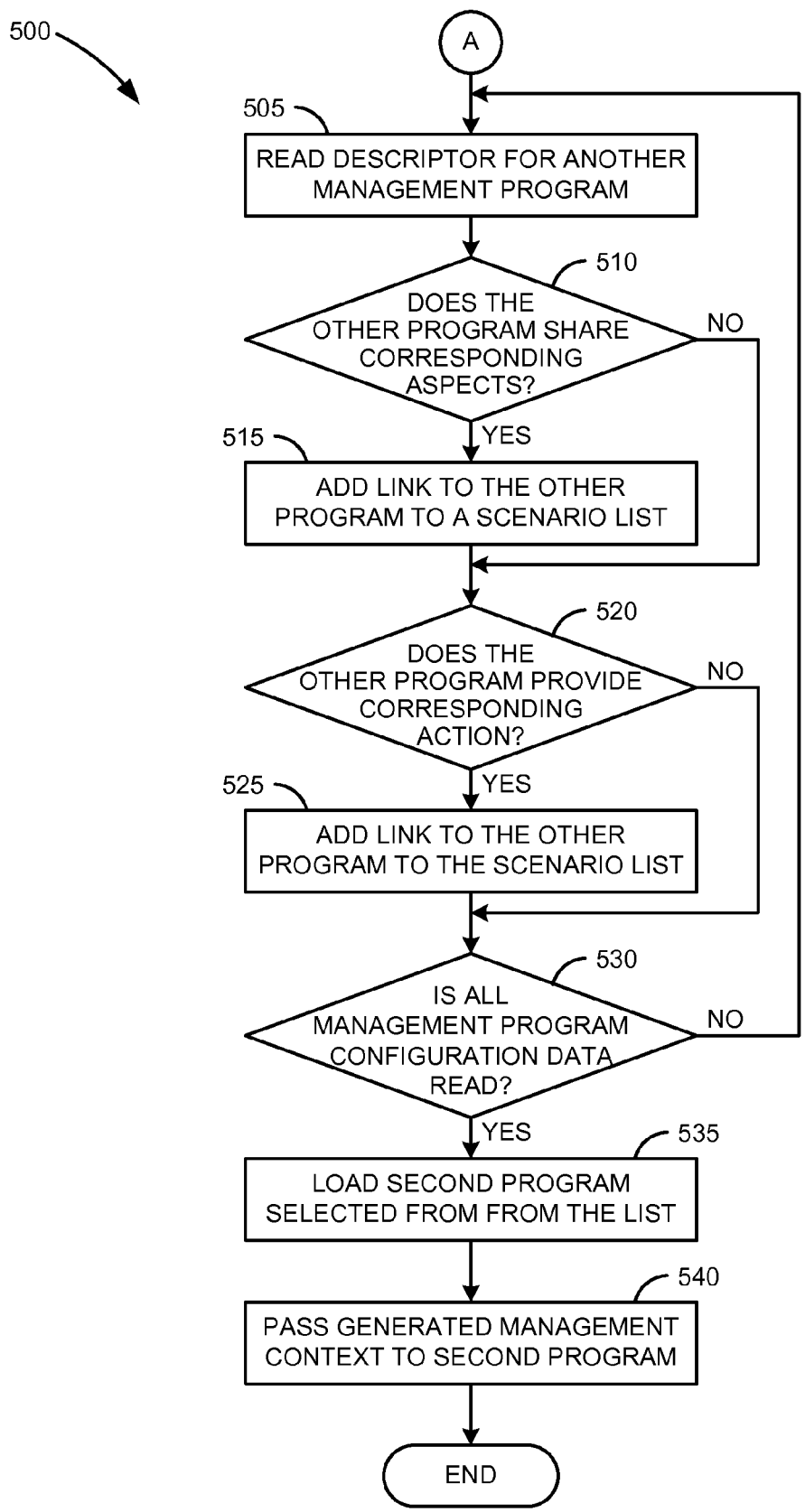
FIG. 5 illustrates a second part of the process for generating dynamic scenarios for managing computer system entities, according to one embodiment.

The process for generating dynamic scenarios for managing computer system entities continues in FIG. 5 illustrating its second part 500. At 505, a descriptor for a management program from a set of available management programs, other than the first program, is read from the loaded configurations. Then, at 510 it is verified whether the other management program has a corresponding entity aspect that is also corresponding to the first management program. In one embodiment, the aspect is a characteristic of the selected computer system entity. For example, the first program could be used for administering a service log entity. Based on the check at 510, another program that can be used for administering service entities could be identified for a possible management scenario. When the first program and the other program share a corresponding aspect, a link to the other program is added to a management scenario list at 515.

Verification is performed at 520 to check whether the other program provides an action corresponding to the action performed by the first program. In one embodiment, a management scenario may involve management programs that are related not only by the corresponding computer system entities, but also by the actions that are executed. For example, the first program could be used for administering a service log entity. Based on the check at 520, another program that can be used for managing logs could be identified for a possible management scenario. When the first other program provides action corresponding to an action provided by the first program, a link to the other program is added to the same or other scenario list at 525.

The process operations from 505 to 525 are iteratively executed for all management programs other than the first program, until, at 530, it is verified that all management program configuration data has been read, e.g. all available plug-ins has been checked for compatibility to generate management scenarios. The created scenario list provides possible next steps for administering the selected computer system entity, or for administering new entities consistent with the execution of the first program. According to one embodiment, the identified applicable other management programs are not associated with a particular order of execution, they rather represent available options for systematic entity management in the computer system environment.

At 535, a second program selected from the generated scenario list is loaded in the administrator framework. The second program could be executed within the same management context with the first program to provide consistent entity administration. Therefore, the management context generated during the execution of the first program is passed to the second program at 540. For example, a pointer to stored context data could be assigned to a context parameter of the second program.

In one embodiment, when a user selects and opens a first management program within an administrator application tool, a list of other management programs compatible with the first program is received. This list is generated in runtime and it depends on the computer system entity that the opened managed program shows to the user (e.g. is currently managed). If the user selects other entity from different type or another aspect of the same entity, or executes another action within the first management program, then this list could be generated again, and it could be totally different.

In one embodiment, the concept of providing dynamic scenarios for managing computer system entities is adopted by management applications embedded within NetWeaver™. For example, in an application descriptor for a NWA plug-in for managing application modules information about the entities of type "ejb_configuration" that could be administered is added. Table 1 shows an example snippet of the descriptor of this management program:

TABLE 1

Management application descriptor

```
<ns2:resourceType>
    <ns2:type>ejb_configuration</ns2:type>
    <ns2:action>configure</ns2:action>
</ns2:resourceType>
```

When executed, the program for managing application modules requests NWA framework for possible navigation links to other management applications that could manage entities from "ejb_configuration" type. The NWA framework returns a list with navigation links visualized to a user operating with the management program. The list may contain other compatible management programs and information for the supported management actions. When the user selects a link, the corresponding other management program is loaded, and a relevant action may be triggered.

The descriptors of the management programs may be generated as files with a predefined structure in a particular format. For example, the descriptors may be contained in eXtensible Markup Language (XML) formatted files deployed by the administrator frameworks together with the source files of the management applications. The information in the descriptor files may be organized based on different criteria or categorization approach of the relationships between the management applications and the computer system entities. The data from the descriptors could be extracted from the files and stored as metadata by the administrator framework.

Figure 6:
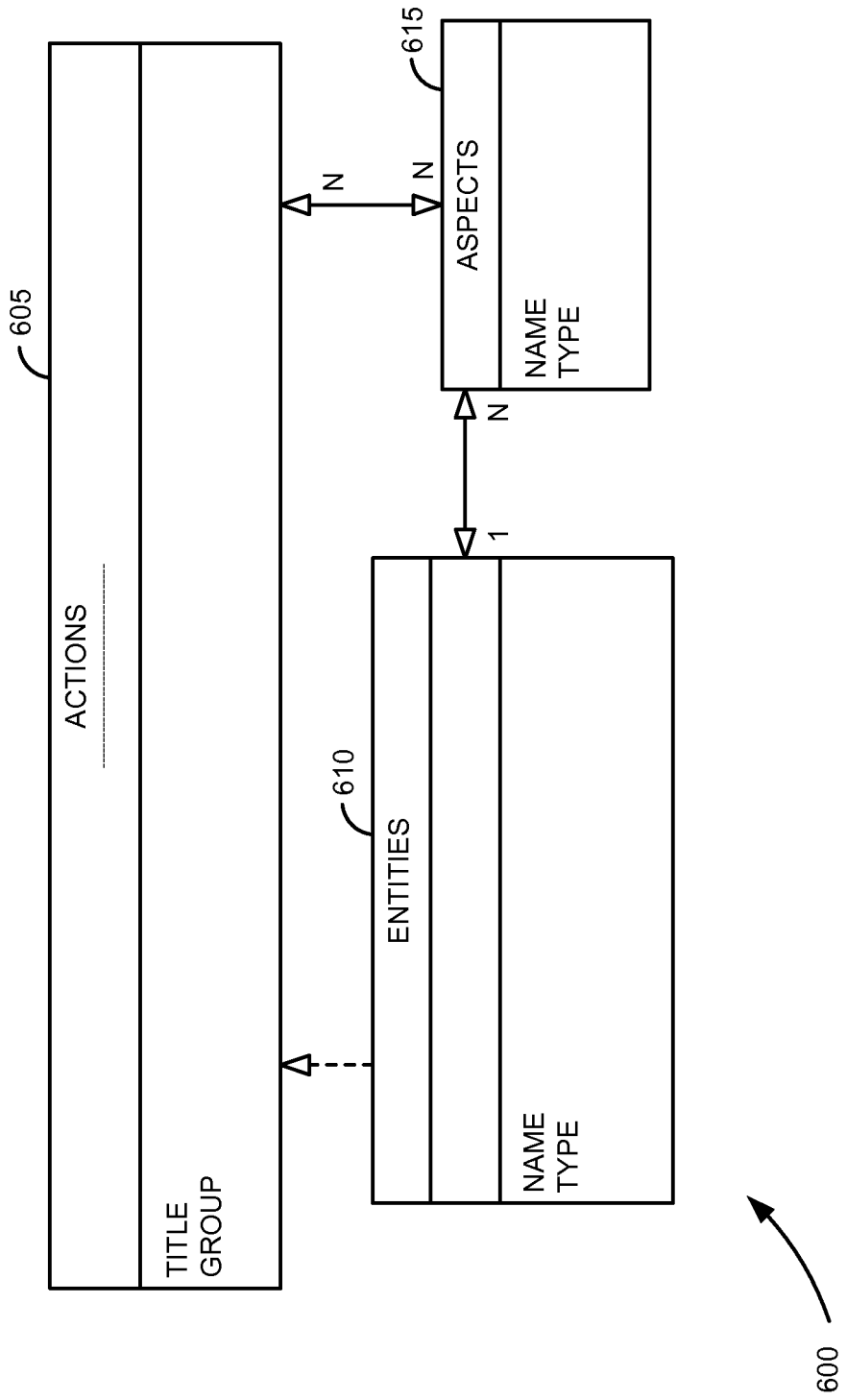
FIG. 6 is a block diagram illustrating data structure of a descriptor of a management program, according to one embodiment.

FIG. 6 shows data structure 600 of the information provided by a descriptor of a management program, according to one embodiment. The management program supports one or more administration actions grouped in "actions" data object 605. The "actions" 605 may be characterized by a "title" and "group" attributes, where "group" may correspond to groups of management programs supporting the same actions.

The "entities" data object 610 stores the computer system entity types that could be administered by the management program. A relationship between the "entities" data object 610 and the "actions" data object 605 could be established. However, such relationship is not required when the computer system entity types are further characterized with aspect types provided in "aspects" data object 615. In one embodiment, a one-to-many relationship connects "entities" data object 610 and "aspects" data objects 615. The "actions" data object 605 and "aspects" data object 615 are connected with many-to-many relationship. Thus, the descriptor may define correspondence between the management program and computer system entities on administration actions and entity aspect types, according to one embodiment.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
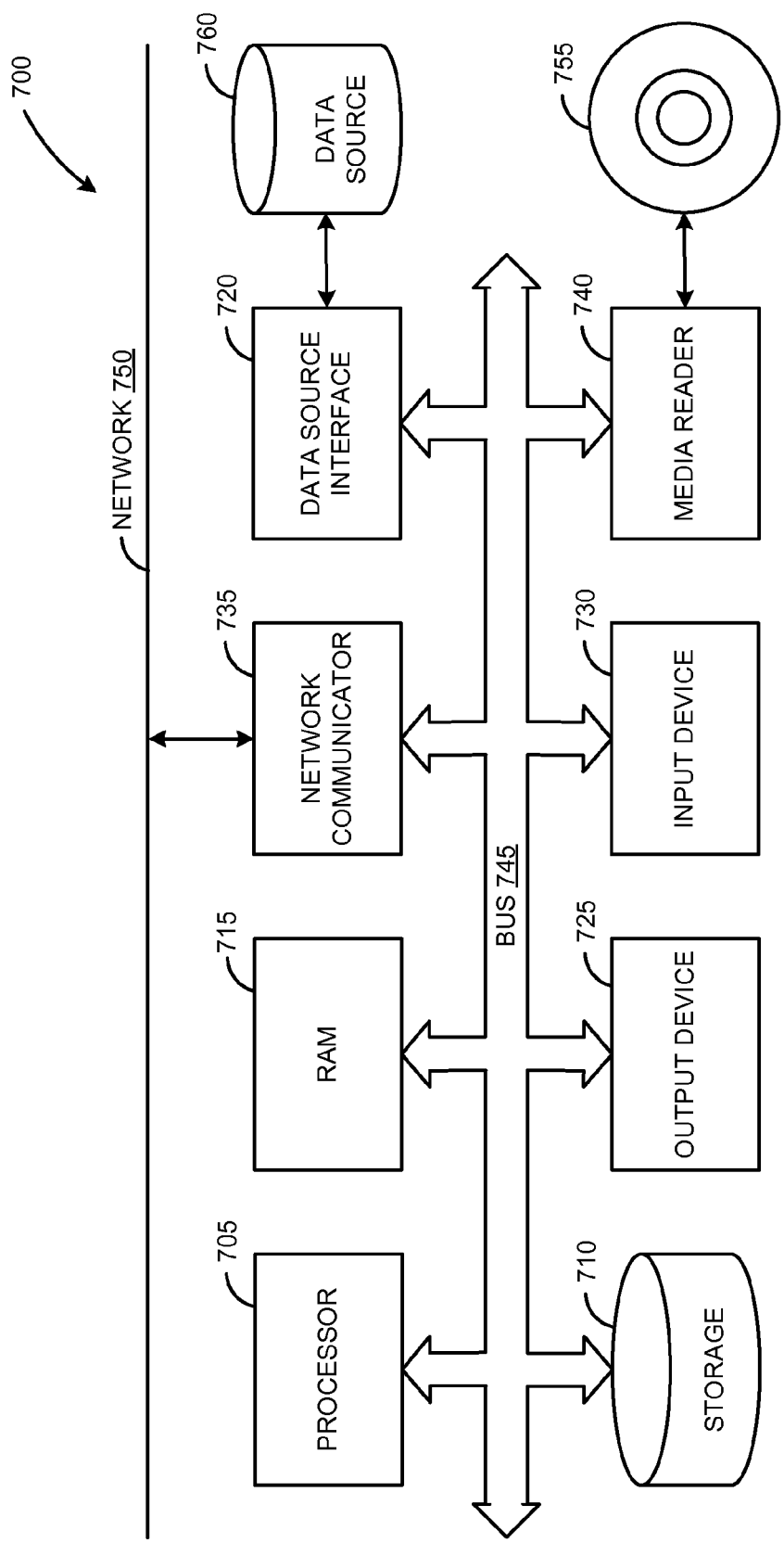
FIG. 7 is a block diagram of an exemplary computer system to generate dynamic scenarios for managing computer system entities, according to one embodiment of the invention.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed via network 750. In some embodiments the data source 760 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer system for generating dynamic management scenarios comprising:
   a memory to store computer instructions; and
   a processor coupled to the memory to execute the computer instructions to
      load a first management program selected from a plurality of management programs;
      read a first descriptor associated with the first management program, wherein the first descriptor specifies a first set of computer entities that can be managed by the first management program from a plurality of computer entities;
      select a first computer entity from the first set of computer entities;
      execute a management action from one or more management actions provided by the first management program, wherein the first descriptor includes at least one relationship between the executed management action and one or more aspects of the selected first computer entity;
      dynamically identify a relationship between the first management program and a second management program from the plurality of management programs, the relationship identified by reading a second descriptor associated with the second management program, the second descriptor specifying a corresponding aspect corresponding to an aspect from the one or more aspects of the first computer entity; and
      upon identifying the relationship, add a link from the first management program to the second management program to a dynamic management scenario for managing the first computer entity.

2. The system of claim 1 further comprising:
   determining whether the second management program provides the executed management action by reading the second descriptor; and
   upon determining that the second management program provides the executed management action supported by the first management program, add a link between the first management program and the second management program to a scenario for managing a second computer entity consistent with the action supported by the first management program.

3. An article of manufacture including non-transitory computer readable storage medium to tangibly store instructions for generating dynamic management scenarios, which when executed by a computer, cause the computer to:
   load a first management program selected from a plurality of management programs;
   read a first descriptor associated with the first management program, wherein the first descriptor specifies a first set of computer entities that can be managed by the first management program from a plurality of computer entities;
   select a first computer entity from the first set of computer entities;

execute a management action from one or more management actions provided by the first management program, wherein the first descriptor includes at least one relationship between the executed management action and one or more aspects of the selected first computer entity;

dynamically identify a relationship between the first management program and a second management program from the plurality of management programs, the relationship is identified by reading a second descriptor associated with the second management program, the second descriptor specifying a corresponding aspect corresponding to an aspect from the one or more aspects of the first computer entity; and upon identifying the relationship, add a link representing the relationship between the first management program and the second management program to a dynamic management scenario for managing the first computer entity.

4. The article of manufacture of claim 3, wherein the non-transitory computer readable storage medium tangibly stores further instructions, which when executed by the computer cause the computer to:

generate a management context for the first computer entity based on the execution of the management action; and pass the management context from the first management program the second management program as part of the dynamic management scenario.

5. The article of manufacture of claim 3, wherein the non-transitory computer readable storage medium tangibly stores further instructions, which when executed by the computer cause the computer to:

determining whether the second management program provides an action corresponding to the executed management action by reading the second descriptor; and upon determining that the second management program provides the action corresponding to the executed management action, add a link between the first management program and the second management program to a dynamic management scenario for managing a second computer entity consistent with the executed management action.

6. The article of manufacture of claim 3, wherein selecting the computer entity comprises:

displaying a user interface (UI) associated with the first management program, wherein the UI includes the first set of computer entities.

7. The article of manufacture of claim 3, wherein the non-transitory computer readable storage medium tangibly stores further instructions, which when executed by the computer cause the computer to:

determining whether the second management program provides an action corresponding to the executed management action by reading the second descriptor; and upon determining that the second management program provides the action corresponding to the executed management action, add a link between the first management program and the second management program to a dynamic management scenario for managing a second computer entity consistent with the executed management action.

8. A computer implemented method for generating dynamic management scenarios comprising:

loading in a computer system memory a first management program selected from a plurality of management programs;

reading a first descriptor associated with the first management program, wherein the first descriptor specifies a first set of computer entities that can be managed by the first management program from a plurality of computer entities;

selecting a first computer entity from the first set of computer entities;

executing a management action from one or more management actions provided by the first management program, wherein the first descriptor includes at least one relationship between the executed management action and one or more aspects of the selected first computer entity;

dynamically identifying by a processor a relationship between the first management program and a second management program from the plurality of management programs, wherein the second management program has a corresponding aspect corresponding to an aspect from the one or more aspects of the first computer entity; and upon identifying the relationship based on the corresponding aspect, adding a link representing the relationship between the first management program and the second management program to a dynamic management scenario for managing the first computer entity.

9. The method of claim 8 further comprising:

generating by the processor in the memory a management context for the first computer entity based on the execution of the management action; and passing the management context from the first management program to the second management program as part of the dynamic management scenario during an execution of the second management program.

10. The method of claim 8, wherein the first descriptor includes at least one relationship between the first management program and the corresponding aspect of the first computer entity.

11. The method of claim 8, wherein the first descriptor includes at least one relationship between an action of the one or more actions provided by the first management program and at least one aspect from the one or more aspects of the first computer entity.

12. The method of claim 8, wherein selecting the computer entity comprises:

displaying a user interface (UI) associated with the first management program, wherein the UI includes the first set of computer entities.

13. The method of claim 8, further comprising:

in the first descriptor, dynamically locating a relationship connecting the first management program to the corresponding aspect of the first computer entity.

14. The method of claim 8 further comprising:

selecting an action from the one or more management actions provided by the first management program; and in a second descriptor, dynamically identifying the second management program, wherein the second management program supports the selected action.

* * * * *